H. A. HEUPEL.
PROCESS AND APPARATUS FOR TREATING PRESSED GLASS ARTICLES.
APPLICATION FILED AUG. 30, 1910.
Patented Apr. 6, 1915.
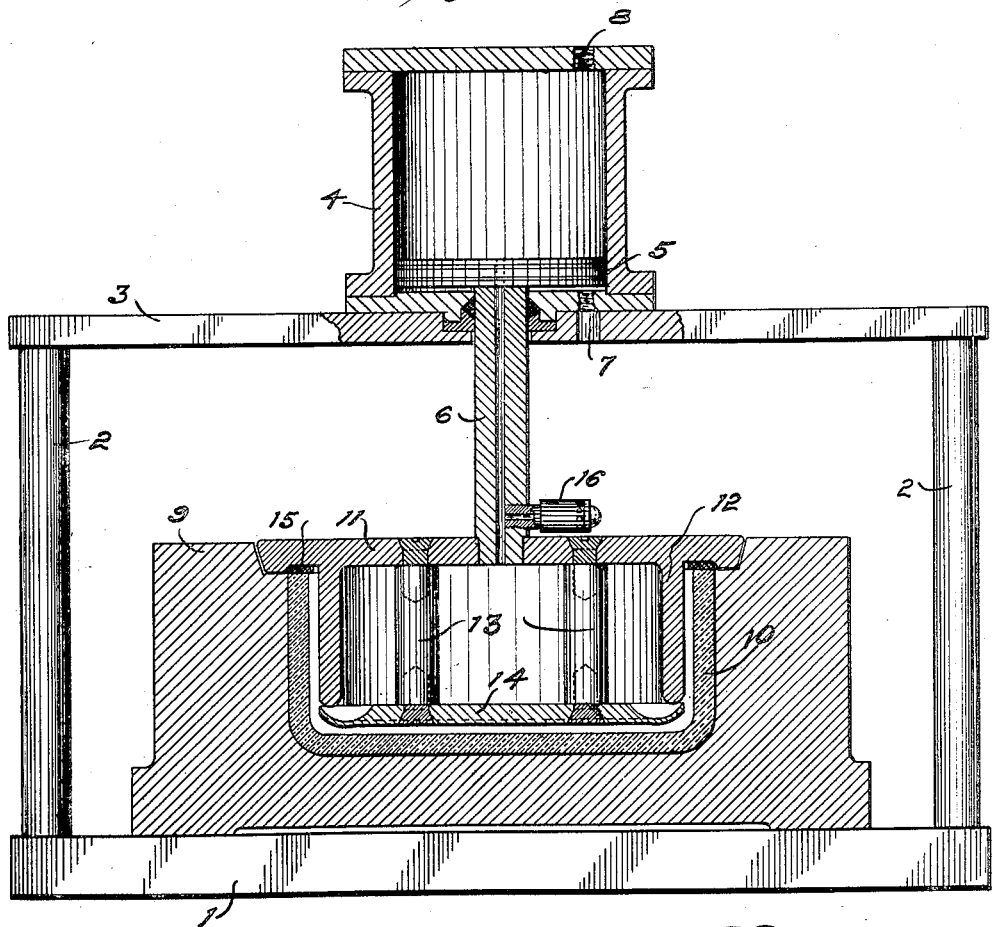
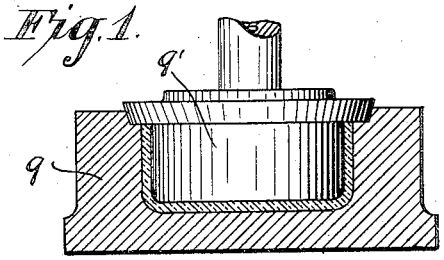
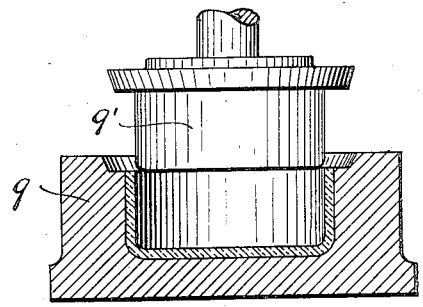

UNITED STATES PATENT OFFICE.

HERMAN A. HEUPEL, OF CHARLEROI, PENNSYLVANIA, ASSIGNOR TO MACBETH-EVANS COMPANY, OF PITTSBURGH, PENNSYLVANIA, A CORPORATION OF PENNSYLVANIA.

PROCESS AND APPARATUS FOR TREATING PRESSED GLASS ARTICLES.

1,134,200.  Specification of Letters Patent.  Patented Apr. 6, 1915.

Application filed August 30, 1910. Serial No. 579,709.

*To all whom it may concern:*

Be it known that I, HERMAN A. HEUPEL, a citizen of the United States, residing at Charleroi, in the county of Washington and State of Pennsylvania, have invented certain new and useful Improvements in Processes and Apparatus for Treating Pressed Glass Articles, of which the following is a specification.

The invention relates to the treatment of pressed glass articles or shells after the presser means or forming plungers have been withdrawn from the shells and while the glass is still in a semi-plastic condition. In the formation of a pressed article the forming plunger must be withdrawn before the glass becomes rigid, otherwise breakage will occur, and the glass in its semi-plastic state and unsupported by the forming plunger tends to sag or lose the shape into which it had been pressed, besides which the withdrawal of the plunger creates suction which tends to draw inward the still plastic sides of the article. My invention is designed to meet these conditions and to provide an improved process and means whereby the glass shell is held securely in position in its mold or form after the withdrawal of the forming plunger and whereby any distortion caused by withdrawing the plunger will be corrected and the article brought back to correct and accurate shape and dimension.

Further objects of the invention are the provision of a process and means whereby the glass is held in position in the mold without injury to the surface of the glass and wherein the surface is fire polished and improved by the holding operation; and the provision of a process and means wherein the holding operation may be performed quickly and at a relatively slight cost.

Figures 1 and 2 are sections through molds in which the preliminary steps of forming the glass article and withdrawing the forming member or plunger are illustrated, and Fig. 3 is a section through the apparatus in which the final step of the process is carried out.

Referring to the drawing, 1 is the base of the apparatus, which base is provided with a plurality of posts 2 carrying the plate 3, upon which plate is mounted the air cylinder 4. The cylinder is provided with a piston 5 carrying a hollow piston rod 6, and air may be supplied for moving the piston through the passages 7 and 8, to which the necessary connections from a source of supply (not shown) are made. Resting upon the base 1 is the mold 9 in which the glass article or shell 10 has previously been pressed. The lower end of the piston rod 6 is provided with a cover plate 11 having a downwardly projecting collar 12 which is spaced away from the side wall of the shell 10 a slight distance. Adjacent the bottom of the shell and supported by the posts 13 is a baffle plate 14 whose periphery is spaced away from the lower edge of the collar 12 a slight distance to provide an annular passageway for the air. A tight joint is made between the edge of the article 10 and the cover 11 by means of an asbestos packing ring 15 secured in a groove in the cover plate. A safety valve 16 prevents too high a rise of pressure in the shell.

In carrying out the process the shell or article 10 is first pressed into the form shown in the mold 9 (Fig. 1) by means of the usual forming member or plunger 9', which plunger is removed when the glass has hardened sufficiently to prevent its running in the mold as indicated in Fig. 2. The mold 9 is then quickly shifted to the position shown upon the plate 1 (Fig. 3), and air is supplied behind the piston 5 causing the cover plate 11 to move downwardly so that the upper edge of the shell 10 engages the packing upon the upper side of the cover plate. A part of the air supplied to the upper side of the piston 5 passes through the passageway in the piston rod 6 and into the collar 12, from which point it passes through the annular opening between the lower edge of the collar and the periphery of the baffle plate into the space outside of the collar. The pressure thus supplied intermediate the collar and the wall of the shell prevents the plastic glass from becoming deformed or sagging, as it otherwise would do if some means were not provided for holding it in position, and if the article has sagged or been drawn inward the pressure will restore it to proper shape and dimensions. The plate 14 serves to prevent the incoming air from impinging directly upon the bottom of the shell, and the peculiarly shaped passage intermediate the edge of the collar and the periphery of the baffle plate provides for a uniform and proper distribution of air pressure upon the walls of the shell, besides producing a kind of whirling action of the air as it flows outward through the annular opening and this appears to improve the action of the air upon the surface of the glass. This whirling action of the air is obtained by providing an annular groove 14' adjacent the edges of the plate 14 whereby the air is deflected upwardly. The cover plate with its collar 12 and baffle plate 14 serve to retain the heat of the glass article, so that a sort of fire polish is given to the inner surface of the shell. After the shell has hardened sufficiently, air is supplied to the passage 7 and exhausted through the passage 8 so that the piston 5 rises lifting the cover plate 11 and permitting the removal of the mold 9, so that the operation just described may be repeated with another mold and shell.

Other specific means for raising and lowering the apparatus may be used if preferred.

Having thus described my invention and illustrated its use, what I claim as new and desire to secure by Letters Patent is the following:—

1. The combination with a mold for a glass shell, of means coöperating therewith to hold the glass shell in form after the forming means has been withdrawn comprising a cover for the open side of the shell, means for supplying fluid under pressure through the cover, and a baffle plate carried by and fixed to the cover and extending transversely of the path of the fluid supplied and within the open end of the shell.

2. In combination with a mold for a glass shell, a cover for the open side of the shell, provided with a wall projecting into the shell but spaced away from the walls thereof, a baffle means beneath the cover and spaced away therefrom, and means for supplying air through the cover to the space between the cover and the baffle means.

3. The combination with a mold for forming glass shells, of a means for maintaining the plastic glass in its molded form after the die or former has been withdrawn from the mold comprising a member for closing the open side of the shell provided with a depending hollow member projecting into the shell and spaced away from the sides and bottom thereof when such member is in its lowest position means for admitting air under pressure through the said closure member at a point within the hollow member and thence to the space outside the said member.

4. The combination with a mold for forming a glass shell, of a cover for the open side of the mold provided with a wall spaced away from the walls of the shells, a plate secured to the cover adjacent the edge of the wall portion thereof, means for admitting air under pressure through the cover, and means on the plate for deflecting the current of air upwardly.

5. The herein described process of forming pressed glass articles which consists in completely forming the article in a mold by means of a die or former, then in withdrawing the former from the article, then in closing the open side of the article and in maintaining the article in its molded form by means of air under compression.

6. In combination with a mold for a glass shell, a cover for the open side of the shell, downwardly projecting means carried by the cover and having its outer surface adjacent to but spaced away from the interior surface of the glass shell when the cover is in position, and means for supplying air through the said means carried by the cover to the space between the said means and the glass shell.

7. In combination with a mold for a glass shell, a cover for the open side of the shell, a downwardly projecting shell carried by the cover and having its outer surface adjacent to but spaced away from the interior surface of the glass shell when the cover is in position, and means whereby air may be supplied to the interior of the shell carried by the cover and thence to the space outside such shell.

8. In combination with a mold for a glass shell, a cover and an air-operated member carrying the cover and having a passage therethrough to the underside of the cover whereby the application of air pressure to the said member causes the cover to seat and at the same time provides pressure on the interior of the shell.

9. The combination with a mold for a glass shell, of means coöperating therewith to hold the glass shell in form after the forming means has been withdrawn comprising a cover for the open side of the shell having a passage for fluid pressure extending downwardly therethrough, means for supplying fluid thereto, and a baffle plate carried by and fixed to the cover and extending transversely of the path of the fluid supplied and within the open end of the mold.

In testimony whereof I have signed my name in the presence of the two subscribed witnesses.

HERMAN A. HEUPEL.

Witnesses:
H. P. FULLER,
J. E. CUPEN.